Dec. 11, 1956 B. M. OLIVER 2,773,980

AMPLITUDE SENSITIVE MULTISTATE DEVICE

Filed Dec. 30, 1950 4 Sheets-Sheet 1

INVENTOR
B. M. OLIVER
BY
H. O. Wright
ATTORNEY

AMPLITUDE SENSITIVE MULTISTATE DEVICE

Filed Dec. 30, 1950 4 Sheets-Sheet 2

INVENTOR
B. M. OLIVER
BY H. O. Wright
ATTORNEY

INVENTOR
B. M. OLIVER
BY H. O. Wright
ATTORNEY

INVENTOR
B. M. OLIVER
BY H. O. Wright
ATTORNEY

United States Patent Office 2,773,980

Patented Dec. 11, 1956

2,773,980

AMPLITUDE SENSITIVE MULTISTATE DEVICE

Bernard M. Oliver, Morristown, N. J., assignor to Bell Telephone Laboratories, Incorporated, New York, N. Y., a corporation of New York Application December 30, 1950, Serial No. 203,652

17 Claims. (Cl. 250—27)

This invention relates to electrical transmission systems, and more particularly, to amplitude sensitive multistate devices therefor. It is an extension of the invention of William M. Goodall as disclosed and claimed in his copending application Serial No. 203,662, filed December 30, 1950, which copending application is being filed concurrently herewith.

One of the operations or processes in those systems of electrical communication in which an information bearing signal is to be represented by pulses, is that process known as quantization. Briefly, the process of quantization depends upon representing a continuous range of signal amplitudes by a finite number of discrete steps or values, a quantum being the difference between two adjacent discrete values. Thus, a plurality of reference levels or amplitude values are initially established to determine these discrete values. When the instantaneous amplitude of the signal falls between a particular pair of these established amplitude levels, a representative condition in the output of the quantizer signifies this particular relation of the input signal amplitude to the predetermined initial reference amplitude levels. When the amplitude of the intelligence signal falls between another pair of levels, a different condition in the quantizer output signifies the new relation. This process is carried out over the full range of signal amplitudes of the input signal.

It is an object of the present invention to represent adjacent amplitude ranges of an input signal by the particular state of operation of a simple multistate device.

It is a more specific object of the invention to indicate when the amplitude of an input intelligence signal falls between a given pair of a finite plurality of discrete reference levels by means of a given level of conduction in the output circuit of a multistate device.

These objects are attained, in the simple embodiments to be described by way of illustration of the principles of the invention, by means of a circuit arrangement comprising a particularly interconnected thermionic vacuum tube amplifier circuit which normally has a large amount of negative feedback and, therefore, a large factor of attenuation in its transmission characteristic to an input signal, and a plurality of switch circuits each of which is uniquely responsive to one of the afore-mentioned discrete amplitude levels of the input signal.

When the level of the input signal is beyond, for example, below a first of the discrete levels, the output current of the amplifier will be determined by the usual components in the amplifier circuit, and because of the large amount of negative feedback, the output current will be substantially independent of the exact level of the input signal. When the level of the input signal is on the other side of, for example, greater than, this first discrete level, one switch circuit will operate to connect a first shunt path around a portion of the amplifier output circuit current path, and thereby change the state of operation of, or the level of conduction through, the device a given amount. Again negative feedback maintains the output current substantially independent of the exact level of the input signal. At substantially the instant that the level of the input signal becomes equal to the first discrete level, the operation of the switch circuit will be such as to substantially eliminate the negative feedback, placing the amplifier in a condition of high gain. This condition of high gain will accelerate the above-mentioned change from one state to the other.

This operation is successively repeated as the amplitude level of the input signal varies to exceed each of the discrete levels. Each switch circuit will successively operate to connect an additional shunt path around the portion of the amplifier output current path. Thus, the level of conduction in the output circuit of the multistate device is successively changed an additional amount indicating that the amplitude level of the input signal now falls between successive pairs of the finite plurality of discrete reference levels.

In one particular embodiment of the invention, the plurality of switch circuits are arranged to connect the shunt paths around a large impedance in the cathode portion of the amplifier output circuit with the particular advantages therefrom to be pointed out in detail hereinafter.

In an alternative embodiment of the invention, the switch circuits are arranged to connect the shunt paths around the anode portion of the amplifier output circuit.

It is a subsidiary object of the invention to produce the desired changes of state in response to exceedingly small increments of input voltage in the vicinity of each discrete reference level.

It is a further subsidiary object of the invention to maintain the output of the multistate device substantially constant for all values of input signal lying between each adjacent pair of discrete reference levels.

In one illustrative embodiment of the invention both of the last-mentioned subsidiary objects are accomplished by the inclusion of a second set of switching circuits related in the particular manner to be described to the amplifier circuit and to the first set of switching circuits. In other embodiments to be described these objects are separately accomplished.

Particular features of the invention reside in the aforementioned switching circuits isolated from the amplifier circuit.

These and other objects, the nature of the present invention, and its various features and advantages, will appear more fully upon consideration of the various specific illustrative embodiments, shown in the accompanying drawings and in the following detailed description of these embodiments.

In the drawings:

Fig. 1, given by way of illustration, shows in electrical schematic diagram form, an embodiment of a basic circuit which will be of aid in explaining the principles of the present invention and corresponds to Fig. 1 in said Goodall application;

Fig. 2, given by way of illustration, is the generalized current characteristic of the device of Fig. 1, and corresponds to Fig. 3A of said Goodall application;

Fig. 3 shows in electrical schematic diagram form an embodiment of the multistate device in accordance with the principles of the present invention;

Fig. 4, given by way of explanation, is the generalized current characteristics of the multistate device of Fig. 3;

Figures 4, 5:
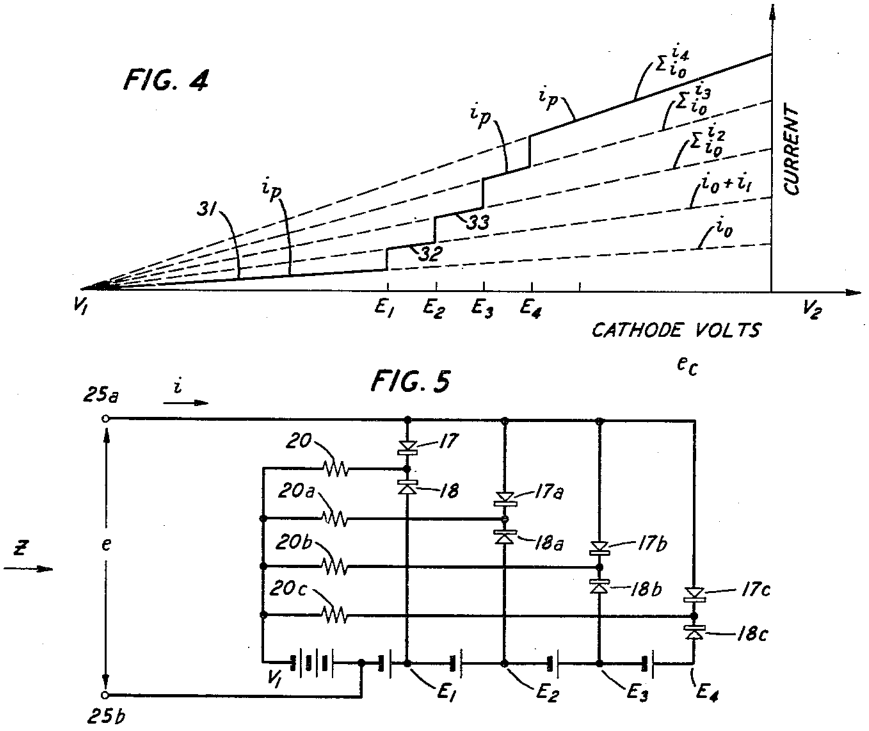
Fig. 5 shows in electrical schematic diagram form the switching circuits of Fig. 3 in accordance with a feature of the invention.
Figure 7:
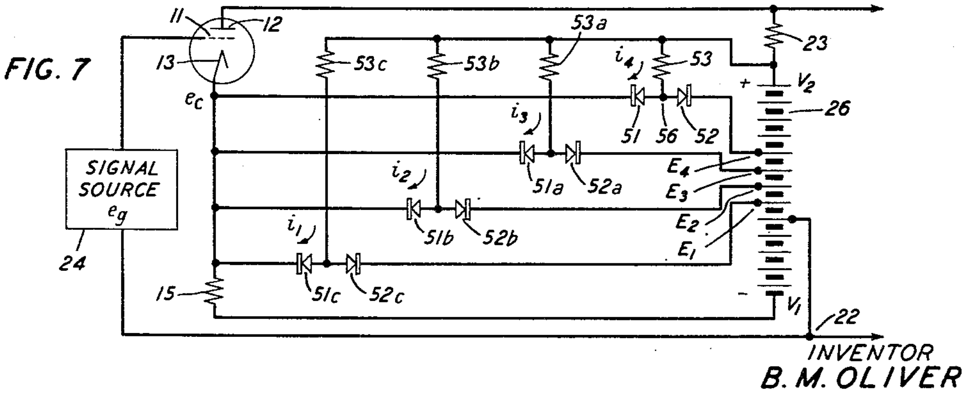
Fig. 7 shows in electrical schematic diagram form a second embodiment of the present invention.
Figure 8:
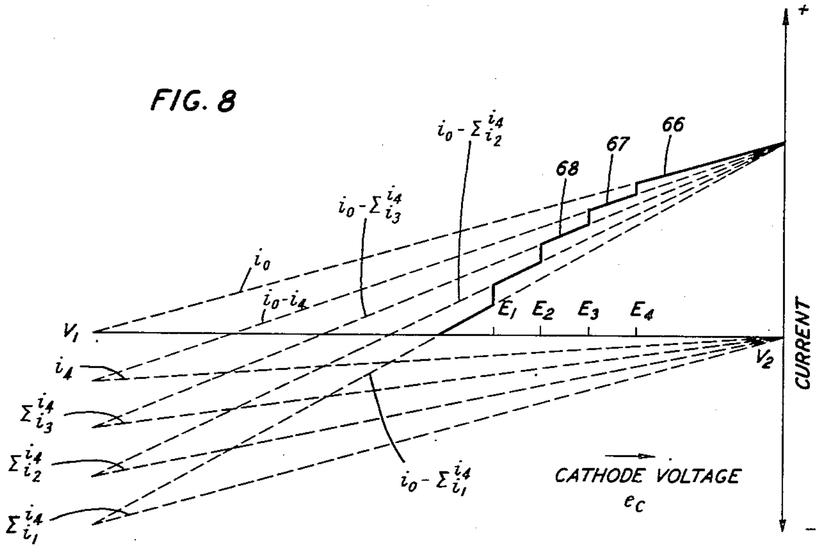
Figure 9:
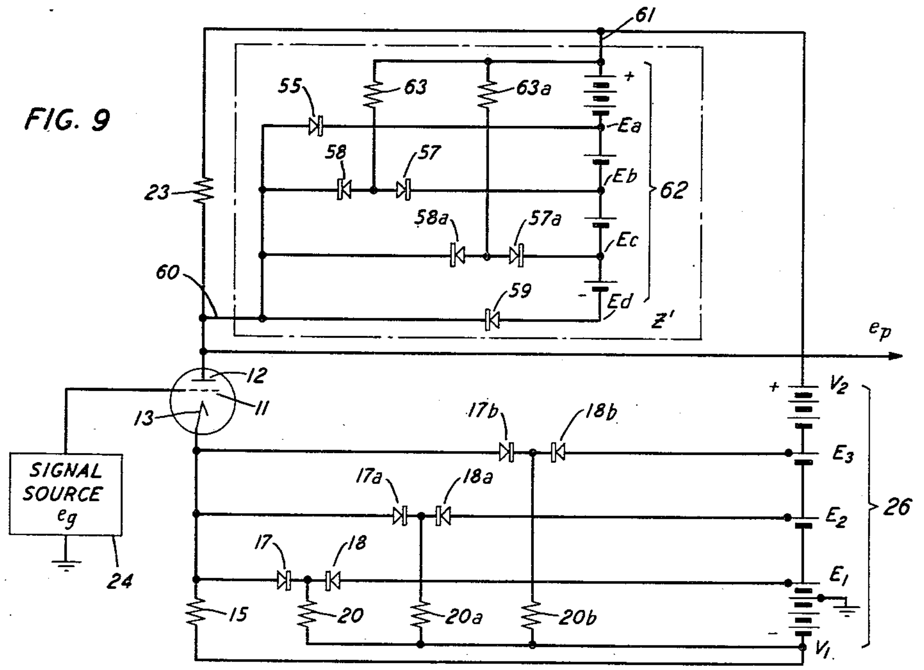
Figure 10A:
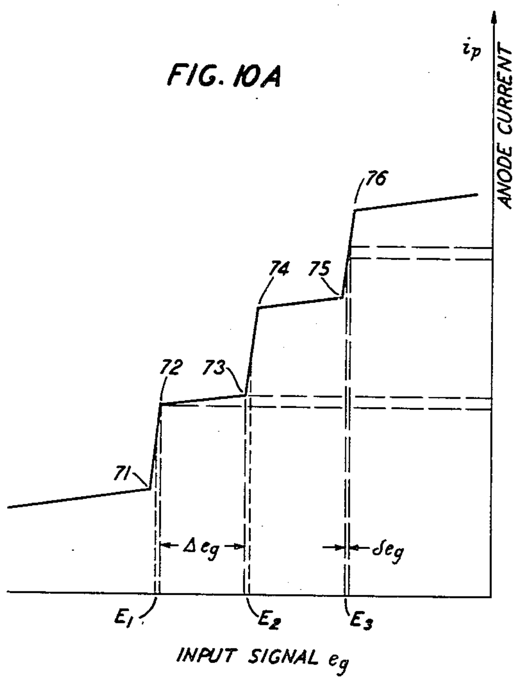
Figure 10B:
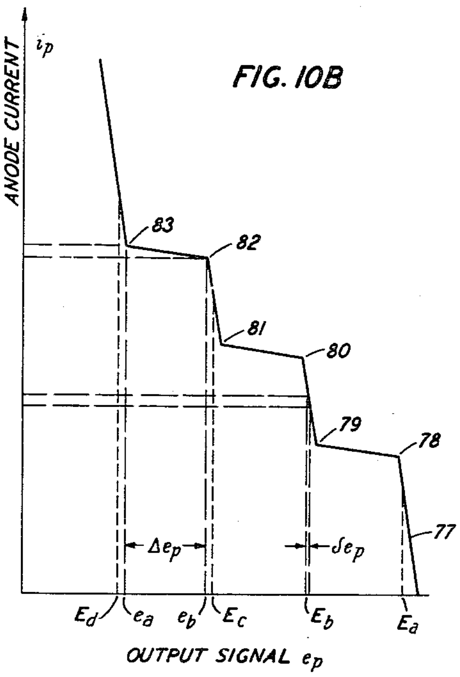
Figure 10C:
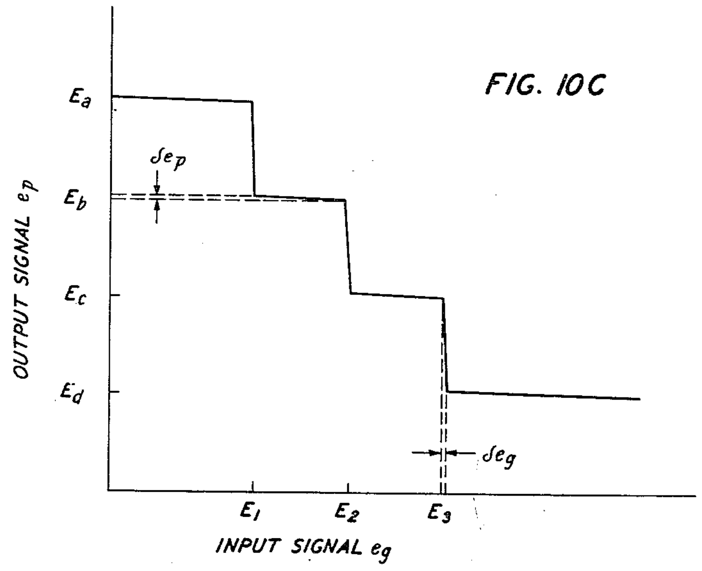

Fig. 8, given by way of explanation, is the generalized current characteristics of the multistate device of Fig. 5;

Fig. 9 shows in electrical schematic diagram form another embodiment of the invention in accordance with subsidiary objects thereof; and Figs. 10A, 10B and 10C, given by way of explanation, are the generalized input signal versus current, current versus output signal, and input signal versus output signal, respectively, of the multistate device of Fig. 7.

Figure 1:
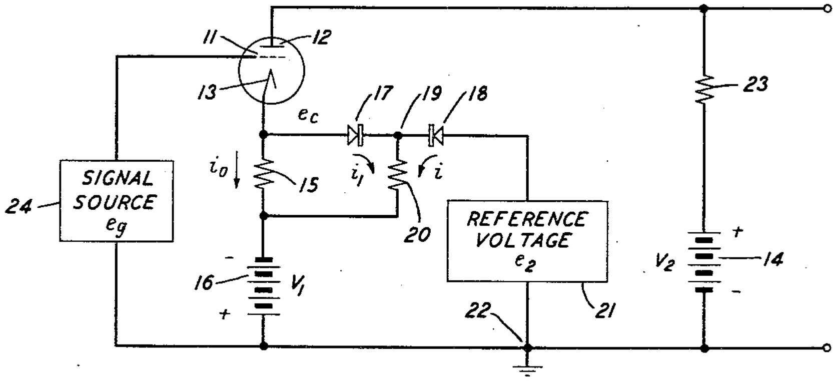
Figure 2:
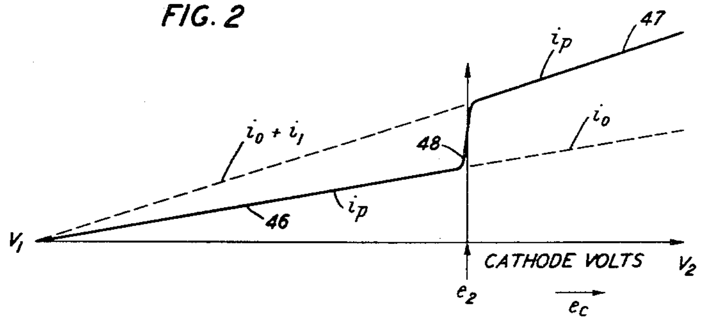

As pointed out above, Figs. 1 and 2 herein correspond to certain figures of said copending Goodall application and are given here with a view to complete and full explanation of the present invention. If a more elaborate explanation thereof is desired, reference should be had to said copending application.

As shown in Fig. 1 and as disclosed and claimed in said Goodall application, the basic circuit of the multistate device comprises a thermionic vacuum tube amplifier having at least a control grid 11, an anode 12, and a cathode 13. An output circuit is connected from anode 12 to cathode 13, which circuit comprises the series combination in the order named of a load impedance 23, a multilevel source of anode potential comprising sources 14 and 16, and a cathode impedance 15. The anode potential is divided into a positive voltage $V_2$ from source 14 and a negative voltage $V_1$ from source 16 in order to obtain an intermediate potential point 22, the voltage level of which point 22 will be considered the reference or ground for all voltages or potentials referred to hereinafter unless otherwise particularly specified. Sources 14 and 16 are each connected with their positive terminals in the direction of anode 12. The value of cathode impedance 15 should be many times the value of load impedance 23 for the reasons to be discussed in detail hereinafter.

An input circuit is connected from the grid 11 to the cathode 13, which circuit comprises the source 24 of a signal $e_g$ to be compared with a reference level, potential source 16 and cathode impedance 15, the three elements being serially related in the input circuit.

Connected from cathode 13 to intermediate potential point 22 is a switching path comprising the series combination of a pair of asymmetrically conducting devices 17 and 18, having their like electrodes connected at a common junction point 19, and a source 21 of the reference signal $e_2$. For reasons which will immediately become apparent, source 21 should preferably have a low internal impedance. An impedance 20 having substantially the same relative magnitude of impedance as impedance 15 is connected from the junction point 19 to the negative potential $V_1$ at a point between impedance 15 and potential source 16.

It should be understood that in the present specification and in the appended claims, the term "asymmetrically conducting device" refers to any of the well-known devices which present a relatively low impedance to an applied voltage of one polarity and a very high impedance, i. e., many times the low impedance to an applied voltage of the opposite polarity, so that they permit substantial conduction in but one direction therethrough. Such devices are well-known in the art and include, for example, germanium crystal rectifiers as well as the usual vacuum tube diodes. In the drawing, the usual convention is employed indicating by the direction of the arrowhead symbol the low impedance direction of positive current flow. In addition, phrases such as "a pair of asymmetric devices having like terminals connected together" are intended to include two different types of asymmetric devices having their analogous terminals connected together.

When an amplifier circuit has a cathode impedance, such as 15 in Fig. 1, which is common to the grid or input circuit and to the plate or output circuit, negative or inverse feedback is developed across this cathode impedance from the output circuit to the input circuit. If the value of the cathode impedance is very large, the voltage of the cathode will follow very closely the voltage of the grid, and further, the plate current of the amplifier will be affected only slightly by changes in the grid voltage. Such operation is now considered fundamental in vacuum tube amplifier theory, being that operation commonly exhibited by a cathode follower circuit.

Thus, in the circuit of Fig. 1, assuming that the signal $e_g$ on the grid 11 has an initial level which is negative with respect to the level of the reference signal $e_2$ and is allowed to increase, the voltage $e_c$ of cathode 13 will increase, following substantially the voltage on the grid 11. Because of the large amount of negative feedback due to the large impedance of 15, the current $i_0$ between anode 12 and cathode 13 will remain substantially unchanged, having only a slight slope. The degree of slope may be made as small as desired by increasing the amount of negative feedback.

Pass for the moment to a consideration of the circuit including asymmetrically conductive device 18. Positive current assumed to have a value $i$, will flow from the positive terminal of source 16, through the low impedance voltage source 21, through device 18 in the forward direction as indicated by the arrowhead, and through impedance 20 to the negative terminal of source 16. Since the device 18 has a low impedance for this passage of current, junction point 19 will have substantially the voltage of $e_2$, each taken with reference to point 22. If $e_g$ is sufficiently negative with respect to $e_2$, cathode 13 will be negative with respect to junction point 19, and device 17 will be in its high impedance or low-conduction state. Thus, the level of conduction between plate 12 and cathode 13 and through load impedance 23, designated $i_p$, is determined by the total circuit impedance of 23 and 15, and only to a small extent by the voltage $e_g$. In other words, the plate current $i_p$, is equal to $i_0$, the current through cathode impedance 15, and will increase only slightly from the normal zero grid signal current as voltage $e_g$ is increased.

As voltage $e_g$ increases, a point will eventually be approached at which the cathode voltage $e_c$ is equal to the reference level of $e_2$ and also equal to the potential of junction point 19, and device 17 will begin to conduct. When devices 17 and 18 are both conducting, a low impedance is placed in the cathode circuit of the amplifier, since conduction by both in effect shunts out the high impedance cathode resistance 15. This reduces the negative feedback which will be reduced to a minimum when both devices are conducting equally, and places the amplifier in a high gain condition. Since any increase in the amplitude or level of signal $e_c$ on cathode 13 must then cause an increase in the current $i_p$, the additional current will be drawn through device 17. Now the current $i_p$ is equal to the sum of $i_0$ and the current through device 17. This results in a rapid transfer of the current flowing through resistance 20 from the path through device 18 to the path through device 17.

Junction point 19 is now effectively connected to cathode 13 through the low impedance of device 17. As the level of $e_c$ becomes positive with respect to the level of $e_2$, point 19 becomes positive with respect to the level of $e_2$. Thus, this potential applied across device 18 renders it a high impedance or places it in a low-conduction state.

Further, since point 19 is effectively connected to cathode 13 through device 17, the cathode impedance of the amplifier now comprises the parallel combination of impedance 15 and impedance 20. The amplifier is therefore conducting with an increased current $i_p$ now equal to the current $i_0$, the current formerly flowing through the cathode impedance 15, plus the additional current $i_1$ now flowing through impedance 20 and device 17.

Since the value of parallel combination of impedance 15 and impedance 20 is still large as compared to the value of load impedance 23, there is again a large amount of negative feedback, and there will be no further rapid change in the current flowing through load impedance 23 so long as the level of signal $e_g$ and perforce, the cathode voltage $e_c$ remains more positive than the level of the reference signal $e_2$.

In Fig. 2 the above-described conditions are generalized and represented in a form which will be convenient for use in the development of the embodiments to be described hereinafter. The abscissa of the characteristic shown in Fig. 2 represents voltage while the ordinate represents current. The voltage level of the cathode signal $e_c$ is shown increasing, caused by the increase of the input signal $e_g$, to the right from a voltage $V_1$ representing the potential of source 16. At some point along this abscissa is indicated the reference voltage $e_2$.

The current $i_0$ flowing through cathode impedance 15 and the sum current of $i_0$ and $i_1$ and current $i_1$ being that current flowing in the low impedance direction through device 17, are represented by the broken line characteristics of Fig. 2. The anode current $i_p$ is represented by the solid line characteristic of Fig. 2. In the region in which $e_c$ is less than $e_2$, the anode current $i_p$, as shown by portion 46 is equal to $i_0$. In the region in which $e_c$ is greater than $e_2$, and the anode current $i_p$, as shown by portion 47, is equal to the sum $i_0 + i_1$. The transition portion 48 occurs during the period in which the cathode voltage $e_c$ is equal or substantially equal to the level of $e_2$.

Figure 3:
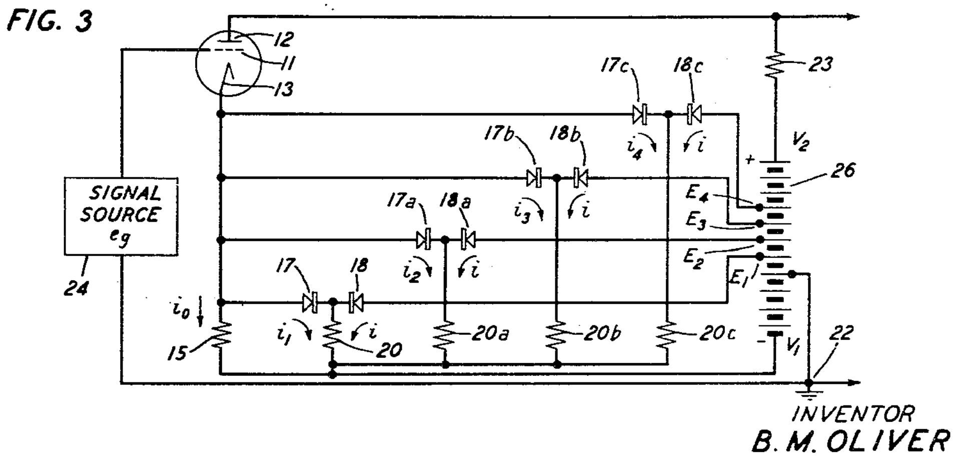

Fig. 3 shows a novel extension, in accordance with the present invention, of the basic circuit of Fig. 1. In Fig. 3, a plurality of switching paths are connected from cathode 13 to intermediate potential point 22. As shown, one such comprises the combination of serially related asymmetrically conducting devices 17 and 18, having their like electrodes connected at a common junction point, and a source of bias potential, which, as represented is a portion of multilevel potential source 26 tapped off, at a voltage $E_1$ positive with respect to point 22. Potential source 26 is connected with its positive terminal in the direction of anode 12 and supplies an anode potential $V_2$, positive with respect to point 22 through impedance 23, and a cathode potential $V_1$, negative with respect to point 22 through an impedance 15. Each of the other of the plurality of switching paths similarly comprise the series combination of pairs of asymmetrically conducting devices **17*a* and 18*a*, 17*b* and 18*b*, and 17*c* and 18*c*, each returned to source 26** at intermediate taps providing bias potentials $E_2$, $E_3$ and $E_4$, respectively.

It should be noted that total number of such paths depends upon the number of discrete quantization steps desired. For example, with the four paths shown, four quantization steps would be obtained. Further, the number of quantization steps desired depends upon what quality of reproduction in the quantized signal is necessary. A full consideration of the factors involved in these determinations may be found in an article entitled "An experimental multichannel pulse code modulation system of toll quality" by L. A. Meacham and E. Peterson, in the Bell System Technical Journal, vol. 27, pages 1 through 43, January 1948.

Since the bias voltages $E_1$, $E_2$, $E_3$ and $E_4$ determine the levels, as will be immediately shown, and the separation between levels in turn determine the particular quantum, these bias voltages are also chosen in accordance with the teachings of the above-mentioned publication. As there considered, the quantization may be uniform, in which case all quanta are equal and the bias potentials $E_1$ through $E_4$ would be equally spaced. If tapered quantization, of the type disclosed in said publication, is desired, the spacing of the bias potentials would correspond to the taper of the distribution of the steps over the desired amplitude range.

For the purpose of explanation herein it will be assumed that uniform quantization is employed, and therefore, that the bias potentials $E_1$ through $E_4$ are substantially equally spaced, and they are all positive with respect to the level of reference point 22, as shown. However, it should be noted that the potentials may be distributed both positive and negative, or negative altogether, with respect to the reference level without affecting the basic operation of the multilevel quantizer to be described. Further, it will be assumed for the purposes of the following explanation, that potential $E_1$ is the smallest and that the remaining potentials increase progressively to the largest potential of $E_4$, as shown.

Means are provided for each path for producing a flow of direct current through one of the devices of each pair when the other device of that pair is in its non-conducting state. This means comprises a connection from the common junction point between each pair of devices 17 and 18, **17*a* and 18*a*, 17*b* and 18*b*, and 17*c* and 18*c*, through the impedances 20, 20*a*, 20*b* and 20*c*, respectively, to the negative potential $V_1$ of source 26. These impedances are each of the same relative magnitude as impedance 15** and may each be substantially equal. Whether or not they are exactly equal depends upon the consideration of the particular type of quantization used as was involved in the spacing and magnitude of the bias potentials considered above.

The operation of the circuit of Fig. 3 and the manner in which this circuit will indicate by a particular level of conduction through impedance 23, the relation of the amplitude of input signal $e_g$ to the levels $E_1$ through $E_4$, which is substantially the relation of the cathode signal $e_c$ to these levels will readily be understood if the following analysis of the circuit of Fig. 3 is considered in connection with the current characteristic representation of Fig. 4. It will be seen that Fig. 4 is similar to Fig. 2, used above to explain the operation of Fig. 1, and that Fig. 4 is plotted to the same coordinates employed in Fig. 2. Thus, the different levels of the potential $E_1$ through $E_4$ are plotted along the voltage abscissa. The current $i_0$, and the successive sum currents of $i_0$ and the currents added when devices 17, **17*a*, 17*b* and 17*c*** successively conduct are shown by the broken line characteristics. For the purpose of illustration on the drawings and in the following specification, these sum currents will be indicated by a symbol such as $$\sum_{i_0}^{i_2}$$

which is understood to mean the sum of all currents $i_0$, $i_1$ and $i_2$.

If the operation of any one pair of asymmetrically conductive devices of Fig. 3 is considered, neglecting for the moment, all other pairs, it should be apparent that the operation of this much of the circuit will duplicate the operation of the circuit of Fig. 1 already described in detail. For example, consider only devices **17*a* and 18*a*. When the level of cathode signal $e_c$ is negative with respect to the potential $E_2$, a current $i$ will flow in the high conduction direction through device 18*a*, and substantially no current will flow in device 17*a*. When $e_c$ is positive with respect to $E_2$, a current $i_2$ will flow through device 17*a* in the direction of high conduction and will combine with the current $i_0$ in load impedance 23**. The reasons for this operation have already been fully described. The same is true for the circuits of each other pair of asymmetrically conducting devices.

Thus, when the signal has caused the cathode voltage $e_c$ to have an amplitude less than the level of $E_1$, the current $i_p$ will be equal to $i_0$ as shown by portion 31 of the characteristic of Fig. 4. When $e_c$ has an amplitude between the level of $E_1$ and $E_2$, the current $i_1$ conducted by device 17 will be added to $i_0$ to give a second level of $i_p$, as shown by portion 32 of the characteristic of Fig. 4. Likewise, when $e_c$ exceeds the amplitude of $E_2$, reaching the range between $E_2$ and $E_3$, device **17*a* will conduct in its low impedance forward direction with a current $i_2$. The net current $i_p$ is now equal to the sum of all currents $i_0$ through $i_2$ as shown by portion 33 of the characteristic of Fig. 4. Such a process of adding one component of current as each bias level is reached and exceeded continues until the highest level has been exceeded. Thus, each separate level of conduction through impedance 23**, or each separate value of $i_p$, represents one quantized value of the input signal $e_g$ and the desired representation of a continuous range of signal values is obtained by a finite number of discrete steps.

A particular feature of the invention resides in the switching circuit per se, whether associated with a thermionic amplifier or not, and in order to call full attention to this feature, the switching circuit alone of Fig. 3 has been redrawn in Fig. 5. Corresponding reference numerals have been employed to designate corresponding components.

Referring to Fig. 5, it will be seen that this circuit is in effect a two terminal impedance, having an impedance Z which varies in accordance with the magnitude of the input voltage. Thus, when the voltage $e$ applied across the input terminals 25*a* and 25*b* is negative with respect to the potential $E_1$, the diodes 17, 17*a*, 17*b* and 17*c* will be nonconducting, the impedance Z will be very large, and the terminal current $i$ will be substantially zero. As the signal voltage $e$ increases and reaches substantial equality with $E_1$, the device 17 will begin to conduct due to transfer of the current through impedance 20 from device 18 to device 17 in the manner already described. When the signal voltage $e$ reaches substantial equality with the successive reference levels, for example, $E_2$ and $E_3$, devices 17*a* and 17*b* will begin to conduct, respectively. Thus, a stepped, broken, or stair-step current versus voltage characteristic is obtained. The slope of this characteristic between any two of the discrete values of $E_1$, $E_2$, $E_3$ or $E_4$ is nearly zero, but at each value the slope changes abruptly to a very large value. The dynamic impedance Z, is the reciprocal slope of this current versus voltage characteristic, and therefore alternates between very high and very low values.

Figure 6A:
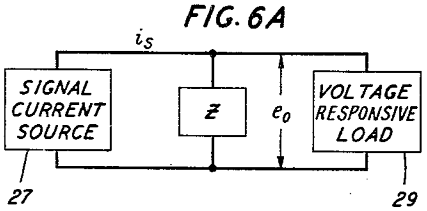
Fig. 6A and Fig. 6B show in electrical schematic diagram form particular advantageous connections of the circuit of Fig. 5.

If such an impedance Z is connected in shunt across any source of signal current $i_s$, such as is indicated in Fig. 6A by a source 27, the output voltage $e_0$ taken across the impedance Z will be the quantized representation of the current $i_s$ in accordance with the invention. In other words, as the current $i_s$ increases the voltage $e_0$ will successively assume a finite number of values or will follow a finite number of discrete steps. This voltage $e_0$ may be applied to any voltage responsive load for utilization, as indicated in Fig. 6A by load 29.

Figure 6B:
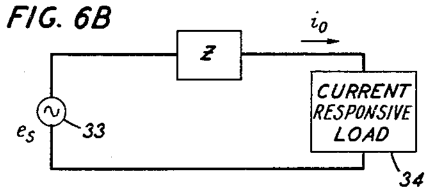

In Fig. 6B the impedance Z is connected in series between a source 33 of a signal voltage $e_s$ and a current responsive load 34. Again in accordance with the invention, a continuous range of signal values are represented by a finite number of discrete levels of conduction of current $i_0$ through load 34, each separate level of $i_0$ representing one quantized value of the signal $e_s$.

Having thus examined the nature of the switching circuit of the multilevel device of Fig. 3, further embodiments of the invention may now be described. Attention is therefore directed to Fig. 7 in which another embodiment of the invention is shown in schematic diagram form, which is basically the same as the circuit of Fig. 3. For this reason, corresponding reference numerals have been used to designate corresponding components. Modification will be seen from a comparison of Fig. 7 with that of Fig. 3 to reside in the reversed polarity of the plurality of pairs of asymmetrically conducting devices, now numbered 51 and 52, 51*a* and 52*a*, 51*b* and 52*b*, and 51*c* and 52*c*, respectively. Further modification resides in the fact that the impedances numbered 53 through 53*c*, are each connected from junction point 56 between each pair of asymmetrically conducting devices, respectively, to the positive potential $V_2$ at a point between load 23 and multipotential source 26. The relation between the potential to which impedances 53 through 53*c* are returned and the polarity of each pair of devices remains such as to cause positive direct current flow through devices 52 through 52*c*, respectively, of each pair in the forward low impedance direction thereof when the device 51 through 51*c*, respectively, of each pair is in a non-conducting or high impedance state.

Aided by the background afforded by the foregoing detailed discussion of the operation of the multistate device of Fig. 3, the operation of the circuit of Fig. 7 may be understood without extensive analysis. Thus, when the voltage $e_g$ from source 24 is substantially greater than the voltage $E_4$ from source 29, the cathode voltage $e_c$ which follows the grid voltage $e_g$, will also be greater than $E_4$, device 52 will conduct positive current from the positive terminal of source 26, which current passes through the high impedance of 53 to the terminal of voltage $E_4$ of source 26 which is negative with respect to the positive terminal thereof. Thus junction point 56 will have substantially the same level of voltage as $E_4$ and device 51 will be in its high impedance or nonconducting condition.

Therefore a first state of the multistate device of Fig. 7 is determined by a first level of conduction between cathode 13 and anode 12, which level is assumed by the amplifier independent of any shunting effect of the asymmetrically conducting devices. Because of the large amount of negative feedback, this level of conduction remains substantially constant regardless of any change in the level of signal $e_c$. This is true so long as the level of $e_c$ is greater than that of $E_4$.

When the level of the signal $e_c$ is equal to the level of the signal $E_4$, devices 51 and 52 will conduct equally, which will, in the manner already described, place the amplifier in a condition of high gain by decreasing the negative feedback. Current flowing from source 14 through impedance 53 will transfer from device 52 to device 51. As the level of $e_c$ becomes lower than the level of $E_4$, current transfer becomes complete, and device 52 will assume a high impedance non-conducting state. Junction point 56 will have substantially the potential level of cathode 13 since device 51 is conducting in its low impedance condition.

Thus impedance 53 is effectively connected in shunt with the space current path between cathode 13 and anode 12, which means that the current flowing in cathode impedance 15 is made up of the sum of the space current of the amplifier and the current flowing through impedance 53 and device 51. Since the potential $e_c$ of cathode 13 is regulated by the signal voltage $e_g$ and cannot rise substantially, the circuit must maintain a constant current through impedance 15 by providing a decrease in the space current between cathode 13 and anode 12 equal to $i_4$, the current conducted by device 51.

Therefore a second state of the multistate device is obtained, determined by a second level of conduction between cathode 13 and anode 12. This second level is lower than the first level by the amount $i_4$, the conduction of device 51. Due to the present large amount of negative feedback, this second level also remains substantially constant regardless of any change in the level of signal $e_1$ so long as the level of the cathode voltage $e_c$ lies between the level of $E_4$ and $E_3$.

The above-described action is repeated each time the level of the signal $e_g$ causes the cathode voltage $e_c$ to drop below the bias level of $E_3$, $E_2$, and $E_1$, with the currents $i_3$, $i_2$ and $i_1$, respectively, being successively subtracted from the current passing between anode 12 and cathode 13 and through load impedance 23 as each of the devices 51*a*, 52*b* and 52*c*, respectively, assume conduction in their low impedance direction.

In Fig. 8 these conditions of operation are conveniently represented in a generalized form similar to Figs. 2 and 4. In Fig. 8, the abscissa represents voltage while the ordinate represents current. The current $i_0$, that is the current which flows through load impedance 23 when none of the devices 51 through 51*c* are conducting and no shunt path is provided around the space current path of the amplifier is shown slightly increasing with increase in the cathode voltage $e_c$. The current $i_4$, which is that current conducted by the path comprising impedance 15 and device 51, when the latter is in its low impedance condition. Also the additional sum currents which result when devices 51$a$, 51$b$, and 51$c$ successively change to their low impedance condition are shown as negative currents which slightly decrease as the voltage $e_c$ increases. These currents are shown as negative since they are in effect substracted from the current $i_0$ when all or part of device 51 through 51$c$ are conducting. The resulting difference currents, i. e., $$i_0-i_4,\ i_0-\sum_{i_3}^{i_4},\ i_0-\sum_{i_2}^{i_4}, \text{ and } i_0-\sum_{i_1}^{i_4}$$

are therefore the graphical sums of the characteristic of $i_0$ and the respective sum characteristics of $$i_4,\ \sum_{i_3}^{i_4},\ \sum_{i_2}^{i_4}, \text{ and } \sum_{i_1}^{i_4}$$

When the voltage $e_c$ has an amplitude greater than the level of $E_4$, the current $i_p$ will be equal to $i_0$, as shown by portion 66 of the characteristic of Fig. 8, thus giving the first level defined above. When $e_c$ has an amplitude between the level of $E_4$ and $E_3$, the current $i_4$ conducted by device 51 will be substracted from $i_0$ to give the second level of $i_p$ defined above as shown by portion 67 of the characteristic of Fig. 8.

Likewise when the voltage $e_c$ is further lowered in amplitude, reaching the range between $E_3$ and $E_2$, device 51$a$ will conduct in its low impedance forward direction with a current $i_3$. The net current $i_p$ is now equal to the difference between $i_0$ and $$\sum_{i_3}^{i_4}$$

as shown by portion 68 of the characteristic of Fig. 8. Such a process of substracting one current component as each bias level is reached and left above, continues until the lowest level has been passed. Thus each separate value of $i_p$ represents one quantized value of the signal $e_g$ and the desired representation of a continuous range of signal values is obtained by a finite number of discrete steps.

As in the circuit of Fig. 3, a particular feature of the multistate device of Fig. 7 resides in the switching circuit per se which may be considered to be a discontinuous two terminal impedance, the value of which varies abruptly as the magnitude of the applied voltage passes through the bias levels. Such an impedance may be employed in the circuits of Figs. 6A and 6B in the same manner and with the same results as have hereinbefore been described with reference to Fig. 5 and Figs. 6A and 6B. Further consideration of the discontinuous impedance of the type employed in the multistate device of Fig. 8 will be given in connection with Fig. 9 hereinafter.

As pointed out with reference to both Fig. 3 and Fig. 7 the polarity of each pair of asymmetrically conducting devices are chosen with reference to the potential to which their associated junction point impedances are returned so that positive direct current will flow through one of the devices of each pair when the other device in that pair is non-conducting. It should now therefore, be apparent to one skilled in the art that combinations of Fig. 3 and Fig. 7 may be had. For example, alternate pairs of devices may be polarized as shown in Fig. 3 with the mid-points therebetween returned to a negative potential while the remaining pairs may be polarized as shown in Fig. 7 with the mid-points therebetween returned to a positive potential. One advantage which would thereby be gained would be that the tread slope of the step output characteristic would alternate between two nearly equal values and that individual step heights would remain substantially equal rather than increasing as shown in Fig. 4 or decreasing as shown in Fig. 8.

Having thus described with reference to two particular specific embodiments, the principles of the invention, several important refinements of the invention may be pointed out.

The transition regions, i. e., those portions of the multilevel characteristic in which the multistate device is changing from one state to another, have been illustrated as occurring substantially instantaneously. This is in fact the characteristic which would be obtained with theoretically perfect asymmetrically conducting devices. With the presently known asymmetrically conducting devices, however, it is necessary for the signal voltage to change a substantial fraction of a volt relative to each of the reference levels in order to cause a complete transfer in current from one device to another.

When the entire characteristic of the multistate device is considered, as it has been herein, the increment of voltage determining the transition region is small in comparison to the increment of the states of conduction on either side of the transition region. In some applications this is all that is desired since interest is principally centered upon the conduction occurring during one or another of the several states of operation without regard to the transition period. However, in many other applications, it is required that the increment of voltage necessary to produce complete transition be made as small as possible. In accordance with a subsidiary object of the invention, therefore, the transition region is made of substantially negligible width.

In accordance with another subsidiary object of the present invention, it is desired to maintain the level of conduction in the output circuit of the multistate device substantially constant for all values of the input signal lying within the range between each adjacent pair of discrete reference levels by eliminating the slight slopes of the portions of the characteristics on either side of each transition region. Referring again for the moment to Fig. 4, it is seen that portion 31, which represents the level of conduction, or the current $i_p$, in the first state of the multistate device of Fig. 3, increases slightly as the signal $e_1$ increases. In Fig. 4 the separation between the adjacent quantizing levels $E_1$ through $E_4$ have been exaggerated, so that the slope of the current lines produces more change during a step than would occur in the actual case. To the extent, therefore, that the voltage range over which the cathode is swinging by the signal is negligibly small compared with the voltage of source 16, there will be small effect from the slopes of the current lines.

In Fig. 9 the two last-mentioned subsidiary objects of the invention are accomplished in a specific illustrative embodiment by the unusual and novel combination of one of the basic multistate devices as described with reference to the preceding figures and an additional discontinuous impedance switching circuit connected in the particular manner to be shown. Both the transition region is made of substantially negligible width and the slope of all portions of the characteristics between each of these regions is substantially eliminated. For the purpose of illustrating the principles of this feature of the invention, the basic multistate device of Fig. 3 has been chosen, although the principles may be readily applied to one of the other basic multistate devices, for example, as shown in Fig. 7. Thus, in Fig. 9, the multistate device of Fig. 3 has been substantially duplicated and corresponding reference numerals have been employed. For clarity, only three quantization steps are shown rather than the four of Fig. 3.

Connected across the anode load impedance 23 is a modified version of the discontinuous impedance mentioned hereinbefore with reference to Fig. 7. The components comprising this impedance are enclosed in the box labeled Z′, having two output terminals 60 and 61 connected respectively to the anode 12 and the positive potential $V_2$ of source 26.

The discontinuous impedance Z′ comprises a multi-potential bias source 62 having the positive terminal thereof connected to terminal 61 and having taps for the successively increasing negative potentials $E_a$, $E_b$, $E_c$ and $E_d$. Connected from terminal 60 to bias $E_a$ is one asymmetrically conducting device 55, so poled that major positive direct current would flow therethrough if no conduction were allowed between cathode 13 and anode 12. Connected from terminal 60 to the biases $E_b$ and $E_c$, respectively, are the serially related and oppositely poled asymmetrically conducting device pairs 57 and 58, and **57*a* and 58*a*, respectively. A connection is provided from the positive terminal of source 62 through impedances 63 and 63*a* to the junction point between each pair of devices 58 and 57, and 58*a* and 57*a*, respectively, to produce a flow of positive direct current through devices 57 and 57*a*, respectively, of each pair when devices 58 and 58*a* of each pair are non-conducting. Another asymmetrically conducting device 59 is connected from terminal 60 to bias $E_d$ and is so poled that no positive conduction will take place therethrough when no conduction is present between cathode 13 and anode 12**.

The operation of the circuit of Fig. 9 may readily be understood if the following description of the circuit is taken in connection with the characteristics of Figs. 10A, 10B, and 10C. Fig. 10A shows the characteristic of the anode current $i_p$ between cathode 13 and anode 12 versus the input voltage $e_g$ from source 24 applied to the grid 11. It will be seen that this characteristic is substantially the same as the characteristic of Fig. 4 and demonstrates the operation of the cathode switching circuits already described. Fig. 10B shows the characteristic of the output signal $e_p$, i. e., the voltage at anode 12 versus the current $i_p$. This characteristic demonstrates the operation of the anode switching circuits Z′, to be further described hereinafter. Finally, Fig. 10C is a combination of Figs. 10A and 10B and shows the input versus output characteristics of the circuit of Fig. 9, represented by the characteristic of input signal $e_g$ versus output signal $e_p$.

As pointed out in connection with Fig. 4, the characteristic of Fig. 10A shows the various levels of conduction obtained as the input signal assumes various magnitudes relative to the bias voltages $E_1$ through $E_3$ and also particularly shows the limits of each transition region. Thus, 71 represents the point at which device 17 starts to conduct, and 72 the point at which device 17 has assumed full conduction and device 18 is non-conducting. Similarly devices **17*a* and 17*b* begin to conduct at points 73 and 75, respectively, and have assumed full conduction at points 74 and 76**, respectively. This action produces the step characteristic shown in Fig. 10A having a series of substantially horizontal portions representing the regions between the bias levels and substantially vertical portions representing the regions of transition at each bias level.

The characteristic of Fig. 10B is seen to have similar horizontal and vertical portions. The bias voltages $E_a$, $E_b$, $E_c$ and $E_d$ are chosen so that, as shown on Figs. 10A and 10B the projection on the current axis of each horizontal portion of the characteristic of Fig. 10B falls upon substantially the mid-portion of the projection on current axis of a corresponding vertical portion of the characteristic of Fig. 10A. Conversely then, each horizontal portion projection of Fig. 10A falls substantially upon the mid-portion of a vertical portion projection of Fig. 10B.

Now assume that due to the action hereinbefore described of the cathode switching circuits, a current $i_p$ less than indicated by point 71 is conducted. In this region device 55 will conduct in its low impedance direction holding the voltage of anode 12 substantially at the value $E_a$. This is indicated by portion 77 of the characteristic of Fig. 10B. As $i_p$ is increased, as indicated by the portion between 71 and 72 of Fig. 10A, a point is reached at which conduction through impedance 23 drops the voltage of anode 12 to such an extent that device 55 can no longer conduct. This is represented by point 78 on the characteristic of Fig. 10B. A further increase in $i_p$ will cause a rapid decrease in anode potential $e_p$, as shown by the portion between point 78 and point 79. At point 79 device 58 begins to conduct since the voltage $e_p$ is approaching the bias $E_b$. Further increase in $i_p$ causes device 58 to assume a greater share of the current flowing through impedance 63, until at point 80, diode 57 is non-conducting. Further increase repeats this action with the second pair of devices **58*a* and 57*a*. Thus, at point 81 device 58*a* begins to conduct; at point 82, device 57*a* stops conducting; and at point 83 device 59 begins to conduct. Device 59** will continue to conduct with any further increase in $i_p$.

Taking the action of the cathode and anode switching circuits together, therefore, the input versus output characteristic of Fig. 10C is obtained. It will be seen that the regions in which little change is produced in the anode current $i_p$ by changes in the input voltage $e_g$ (such as the region represented by portion 72—73 of the characteristic of Fig. 10A) correspond to regions in which relatively little change in the output signal $e_p$ is produced by changes in the current $i_p$ (such as the region represented by portion 79—80 of the characteristics of Fig. 10B). Conversely, those regions in which a rapid change of anode current $i_p$ is produced by relatively small changes in the input signal $e_g$ (such as the region represented by portion 75—76 of Fig. 10A) correspond to regions in which a large change in $e_p$ is produced by a small change in $i_p$ (such as region represented by portion 82—83 of Fig. 10B). Thus, in Fig. 10C this action is compounded. The slope in the transition region, or the change in input signal necessary to produce an output signal change of the large quantity $\Delta e_p$, is reduced to the very small amount of $\delta e_g$ as shown on Fig. 10C, rather than the substantial change in input signal $e_g$ from the voltage of point 75 to point 76 which was required in the circuits of Fig. 3 and Fig. 7. Likewise, the slope of the portions between the transition regions, that is, the amount of variation in the output signal produced by the large change $\Delta e_g$ of the input signal, is reduced to the very small quantity $\delta e_p$ as shown on Fig. 10C.

Several alternative arrangements for obtaining these results should be pointed out. For example, in those applications in which it is desirable for the transition region to be of substantially negligible width, the increment of input voltage necessary to cause a complete change of state may be reduced by either of the modifications described in connection with Figs. 6 and 7 of said copending Goodall application. In both of these embodiments the transition region is decreased by an application of positive regeneration during a portion or all of the instant of state transfer.

In the particular embodiment as shown by Goodall in Fig. 6, positive regeneration is obtained by substituting a transitor element having a large base impedance, in place of the more usual form of asymmetrically conducting device. In accordance with these teachings therein, a transitor element may be substituted by one skilled in the art for devices 18 through 18*c* of Fig. 3 herein or for the devices 52 through 52*c* of Fig. 5 herein.

In the particular embodiment as shown by Goodall in Fig. 7 of said copending application, positive feedback is employed to produce positive regeneration in order to decrease the increment of input voltage necessary to cause a complete change from one state to another. In accordance with these teachings therein, positive regeneration by positive feedback may be added to the multistate devices of Figs. 3 and 5 herein by one skilled in the feedback art.

Further, it was pointed out above that a tendency maintaining the level of conduction constant during the region between transition points is found in the constant current qualities of a large voltage source and a high impedance. With reference to Fig. 8 and Fig. 9 of said Goodall application, it is shown that a constant current source may replace such an imperfect constant current combination. Such a constant current source may be any of the well-known constant current devices. For example, a pentode or a saturated diode, either of which draw nearly constant current for different values of applied voltage, would be satisfactory. Other known constant current sources may also be substituted by those skilled in the art. In view of the foregoing disclosure in said copending application, it should be apparent to those skilled in the art that a similar substitution of constant current sources may be made in the present invention by replacing impedances 15, and 20 through 20*c* of Fig. 3, herein, with constant current sources. Similar substitution of one or more constant current sources may be made in the circuit as shown in Fig. 5 herein.

In another embodiment of said copending Goodall application, described therein with reference to Fig. 10, a further method of cancelling any slope in the output characteristic of a multistate device is disclosed and claimed. In view of the disclosure there found, it should be apparent to those skilled in the art that such cancellation may be included in the circuits of the present invention.

In all events, it is to be understood that the above-described arrangements are illustrative of the application of the principles of the invention. Numerous other arrangements may be devised by those skilled in the art without departing from the spirit and scope of the invention.

What is claimed is:

1. In combination, a thermionic tube having at least a plate and a cathode and a control grid, an output circuit connected between said plate and said cathode, a load impedance and a multipotential source of direct current and a cathode impedance serially included in said output circuit, means connected from said cathode to different intermediate potential points on said multipotential source, said means comprising a plurality of separate paths connected from said cathode to said points, each of said paths including a pair of asymmetrically conducting devices having like electrodes connected together, one of said devices in each path being nearer to said cathode in each path than the other of said devices and the other of said devices being serially connected with said one device in said path, a direct current circuit for each of said paths including an impedance connected from a point between each of said pairs of devices to a point in said output circuit, the potential of said last-named point relative to said intermediate potential points causing major direct current to flow through said other device of each pair when said one device of each pair is non-conducting, and a signal voltage input circuit connected from said grid to said cathode and including said cathode impedance.

2. In combination, a thermionic tube having at least a plate and a cathode and a control grid, an anode circuit connected between said plate and said cathode, a multipotential source of direct current included in said anode circuit, a plurality of paths connected from said cathode to predetermined difference potential points on said multipotential source, a pair of asymmetrically conducting devices having like terminals connected together included in each of said paths, and means for each of said plurality of paths for producing a flow of direct current through one of the devices of the pair included in each path when the other device of said pair is non-conducting.

3. The combination in accordance with claim 2 wherein said last-named means comprises impedance means connected from a point between each pair of devices to a point on said multipotential source more positive than any of said unique potential points.

4. The combination in accordance with claim 2 wherein said last-named means comprises impedance means connected from a point between each pair of devices to a point on said multipotential source more negative than any of said unique potential points.

5. In combination, a thermionic tube having at least a plate and a cathode and a control grid, an anode circuit connected between said plate and said cathode, a multipotential source of direct current included in said anode circuit, means connected from said cathode to respectively different intermediate potential points on said multipotential source, said means comprising a plurality of separate electrical paths connected from said cathode to said points, each of said paths including a pair of asymmetrically conducting devices having like terminals connected together, one of said devices in each path being nearer to said cathode in said path than the other of said devices and the other of said devices being serially connected with said one device in said path, means for each of said paths connected from a point between each of said pairs of devices to a point in said anode circuit for causing major direct current to flow through said other device of each pair when said one device of each pair is non-conducting, and an input circuit connected from said grid to said cathode.

6. The combination in accordance with claim 5 wherein said last-named point in said anode circuit is positive with relation to said intermediate potential points.

7. The combination in accordance with claim 5 wherein said last-named point in said anode circuit is negative with relation to said intermediate potential points.

8. An amplitude-sensitive multistate device comprising, an electrical amplifier circuit having an input circuit and an output circuit, said input circuit having a portion thereof in common with said output circuit, a plurality of circuits each including a pair of serially related asymmetrically conducting devices having like terminals connected together connected in shunt across said common portion, means for each of said plurality of circuits for producing a flow of direct current through one of the devices of the pair included in each circuit when the other device of each circuit is non-conducting, said means for each circuit comprising an impedance connected from a point between the devices of said circuit to a point in said output circuit, and a predetermined source of bias potential having a different total magnitude for each of said plurality of circuits connected in series with said two asymmetrically conducting devices in each of said circuits.

9. In combination, a thermionic tube having at least a plate and a cathode and a control grid, an output circuit connected between said plate and said cathode, a multipotential source of direct current and a cathode impedance serially included in said output circuit, means connected from said cathode to intermediate potential points on said multipotential source, said means comprising a plurality of separate paths connected from said cathode to said points, a pair of serially connected asymmetrically conducting devices having like terminals connected together included in each of said paths, a bias potential having a different total magnitude for each of said plurality of paths included in each of said paths, a direct current circuit for each of said paths connected from a point between each of said pairs of devices to a point in said output circuit, the potential of said last-named point relative to said intermediate potential points causing major direct current to flow through one of the devices of each pair when the other of the devices of each pair is non-conducting, and an input circuit connected from said grid to said cathode and including said cathode impedance.

10. In combination, a thermionic tube having at least a plate and a cathode and a control grid, an output circuit connected between said plate and said cathode, a load impedance and a multipotential source of direct current serially included in said output circuit, means connected from said cathode to intermediate potential points on said multipotential source, said means comprising a plurality of parallel paths connected from said cathode to said points, a pair of asymmetrically conducting devices having like terminals connected together included in each of said paths, one of said devices in each path being nearer to said cathode in said path than the other of said devices and the other of said devices being serially connected with said one device in said path, a bias potential having a different total magnitude for each of said paths included between each of said other devices and said points, a direct current circuit for each of said paths including an impedance connected from a point between each of said pairs of devices to a point in said output circuit, the potential of said last-named point relative to said intermediate potential points causing major direct current to flow through said other device of each pair when said one device of each pair is non-conducting, and an input circuit connected between said grid and a point on said multiple potential source.

11. An amplitude-sensitive multistate device comprising, an electrical amplifier circuit having an input circuit and an output circuit, a first impedance and a first source of direct current potential included in said output circuit, said input circuit having a portion thereof in common with said output circuit, a second impedance and a second source of direct current potential included in said common portion, a plurality of circuits each including a pair of serially related asymmetrically conducting devices having like terminals connected together connected substantially in parallel with each other around said common portion, means for providing respective different biases for each of said plurality of circuits, and means for each of said plurality of circuits for producing a flow of direct current through one of the devices of the pair included in each circuit when the other device of each circuit is non-conducting, said means comprising a third impedance connected from a point between said devices to a point between said second source and said second impedance.

12. In combination, an electrical amplification device, a source of electrical signals to be represented by a finite member of discrete steps of electrical energy coupled to the input of said device, a load circuit for utilizing said steps of electrical energy connected to said output of said device, means for producing said steps of electrical energy in response to said signal, said means comprising at least three substantially parallel electrical paths coupled to said load circuit, each of said paths including a pair of serially related asymmetrically conducting devices having like terminals connected together, means for providing respective different biases for each of said parallel electrical paths, and means for producing a flow of direct current through one device of each pair when the other device of said pair is non-conducting connected across said one device.

13. An amplitude-sensitive multistate device comprising, a thermionic amplifier circuit having an input circuit and an output circuit, a first impedance included in said output circuit, said input circuit having a portion thereof in common with said output circuit, said portion including a second impedance, a first and a second plurality of circuits, each of said first and second plurality including a pair of serially connected asymmetrically conducting devices having like terminals connected together, said first plurality of circuits being connected in shunt with said first impedance, said second plurality of circuits being connected in shunt with said second impedance, means for each circuit of each plurality for producing a flow of direct current through one of the devices of the pair included in said circuit when the other device of said circuit is non-conducting, and a predetermined different potential serially connected in each circuit of both said first and second plurality.

14. In combination, a thermionic tube having at least a plate and a cathode and a control grid, an output circuit connected between said plate and said cathode, a load impedance and a multipotential source of direct current and a cathode impedance serially included in said output circuit, a first means connected from said cathode to an intermediate potential point on said multipotential source, a second means connected from said plate to a point between said load impedance and said multipotential source, each said first and second means comprising a plurality of parallel paths, a pair of serially connected asymmetrically conducting devices having like terminals connected together being included in each of said paths, means providing respective different biasing potentials for each of said paths, a direct current circuit for each of said paths including an impedance connected from a point between each of said pairs of devices to a point in said output circuit, and an input circuit connected from said grid to said cathode and including said cathode impedance.

15. In an amplitude sensitive multistate device, an amplification stage including an input circuit and an output circuit, an output impedance in said output circuit, a plurality of shunt impedances, a circuit means individual to each of said shunt impedances for respectively connecting each of said shunt impedances to points in said load circuit on each side of said output impedance, each of said circuit means including a pair of asymmetrically conducting devices having one pair of like terminals connected together and to one of said shunt impedances, a circuit individual to each of said shunt impedances connecting the series combination of a single one of said pair of asymmetrically conducting devices and said shunt impedance to points in said load circuit on either side of said output impedance, and means for applying a voltage to the other of said pair of asymmetrically conducting devices in each of said switching circuits, said voltage being of a different total magnitude for each of said switching circuits.

16. A two terminal circuit means having a discontinuous impedance characteristic responsive to electrical signals applied across the two terminals, said circuit means comprising first and second terminals, a multipotential source of low internal impedance connected to said first terminal, a plurality of separate conducting paths, each path including a pair of asymmetrically conducting devices having like terminals connected together connected from said second terminal to points of different potential level on said multipotential source, and a plurality of impedances respectively connected to the midpoint between respective pairs of asymmetrically conducting devices, the other terminal of each of said impedances being connected to said multipotential source.

17. In combination, a thermionic tube having at least an anode, a cathode and a control grid, an anode circuit connected between said anode and said cathode, a multi-potential source of direct current included in said anode circuit, a plurality of paths connected from said cathode to predetermined different potential points on said multi-potential source, a pair of asymmetrically conducting devices having like terminals connected together included in each of said paths, means for each of said plurality of paths for producing a flow of direct current through one of the devices of the pair included in each path when the other device of said pair is non-conducting, a second plurality of paths connected from said anode to respective terminals differing in potential from one another, a pair of asymmetrically conducting devices having like terminals connected together included in each of the paths of said second plurality, and means for each of said second plurality of paths for producing a flow of direct current through one of the devices of the pair included in each path when the other device of said pair is non-conducting.

References Cited in the file of this patent

UNITED STATES PATENTS

| | | |
|---|---|---|
| 2,528,885 | Hendricks | Nov. 7, 1950 |
| 2,535,303 | Lewis | Dec. 26, 1950 |
| 2,535,325 | Smeltzer | Dec. 26, 1950 |
| 2,541,932 | Melhose | Feb. 13, 1951 |
| 2,546,338 | Glassford | Mar. 27, 1951 |
| 2,551,150 | McGoffin | May 1, 1951 |
| 2,561,182 | Crane | July 17, 1951 |
| 2,581,124 | Moe | Jan. 1, 1952 |
| 2,584,986 | Clark | Feb. 12, 1952 |
| 2,612,550 | Jacobi | Sept. 20, 1952 |
| 2,616,965 | Hoeppner | Nov. 4, 1952 |
| 2,665,332 | Weiss | Jan. 5, 1954 |